Figure 4:
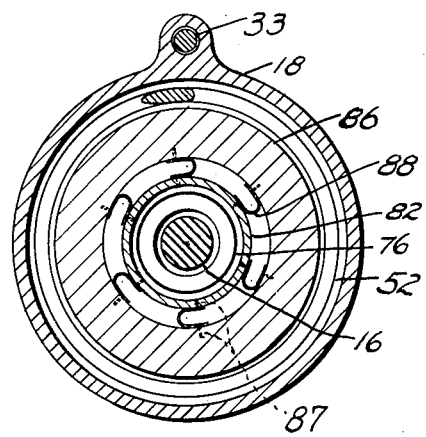

July 17, 1956
C. W. CHILLSON
2,755,078
GOVERNOR
Filed Oct. 30, 1952
2 Sheets-Sheet 1
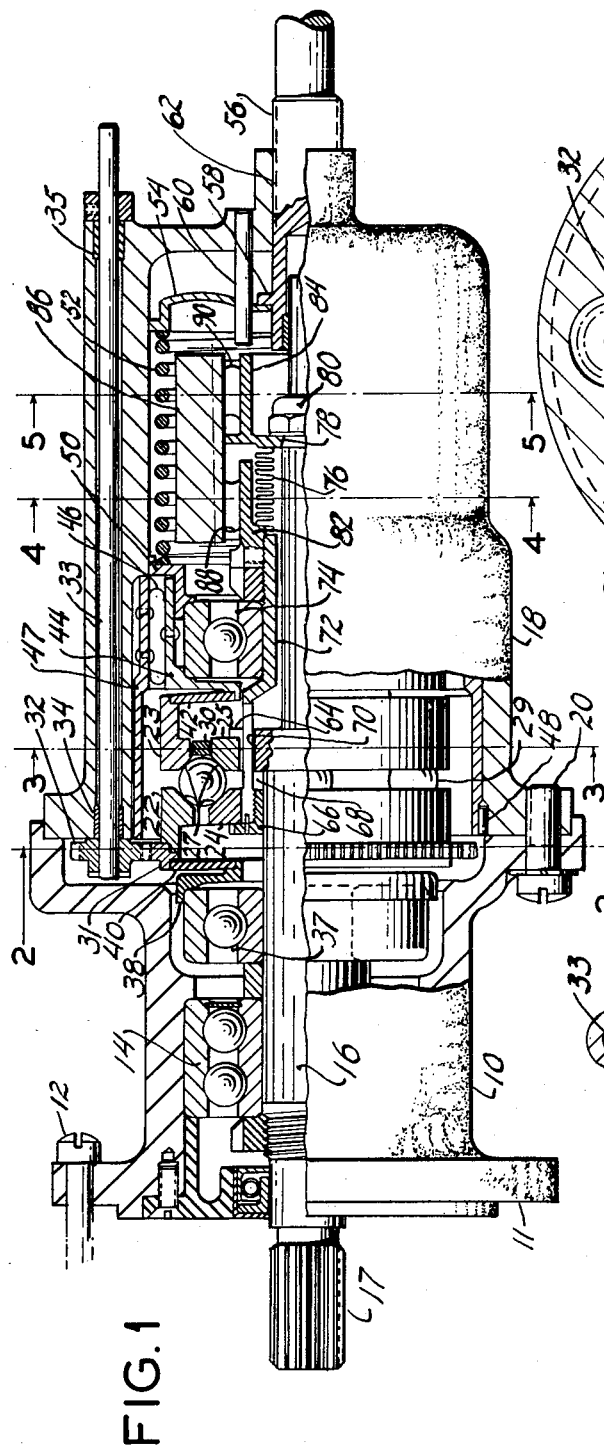
FIG.1
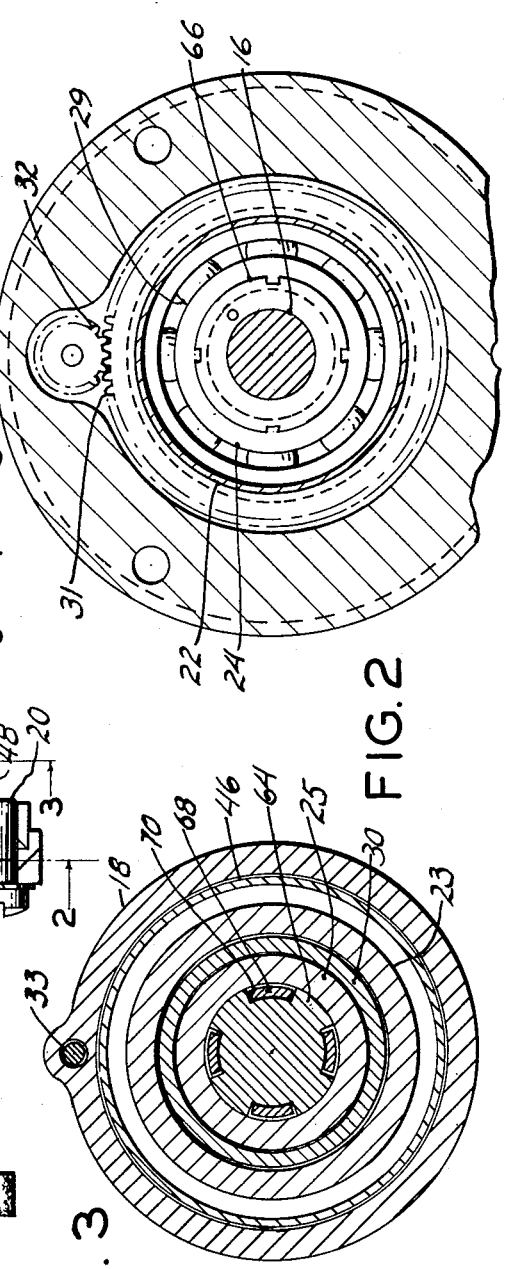
FIG.2
FIG.3
INVENTOR
CHARLES W. CHILLSON
BY *Godfrey B. Speir*
ATTORNEY July 17, 1956   C. W. CHILLSON   2,755,078
GOVERNOR Filed Oct. 30, 1952   2 Sheets-Sheet 2

INVENTOR
CHARLES W. CHILLSON
BY
ATTORNEY

United States Patent Office 2,755,078
Patented July 17, 1956

2,755,078

GOVERNOR

Charles W. Chillson, Caldwell, N. J., assignor to Curtiss-Wright Corporation, a corporation of Delaware Application October 30, 1952, Serial No. 317,705

13 Claims. (Cl. 264—6)

This invention relates to speed controlling governors and is concerned particularly with improvements in centrifugal governors incorporating acceleration stabilization.

The governor of this invention comprises, in general, a plurality of relatively movable ball races and a row of balls between the races and engaged therewith. One of the races comprises an input member driven by the machine whose speed is to be controlled, another constitutes a reaction member, and another, a speed control output element. One of the races is controlled by an acceleration senser incorporated in the governor. The ball and race organization constitute a variable ratio transmission. The balls, in their rotation, develop centrifugal force tending to hurl them outwardly and to displace the races axially, this tendency being counteracted by the force of a governor speeder spring. The shift in race position due to unbalance of these forces produces change in rotational position of the output race, such rotation being usable for control of speed.

An object of the invention is to provide a compact, unitary governor assembly, with acceleration response, with an output element which is positively driven with sufficient power to enable the development of speed correcting signal forces without the use of sensitive servo-mechanisms. A further object of the invention is to provide a powerful governing system of purely mechanical construction which may be used for the speed control of a wide variety of mechanisms, the governor deriving the power for speed control directly from the machine whose speed is to be controlled. A further object is to provide a governor incorporating a speed and acceleration sensing system including frictionally driven ball elements.

Figure 5:
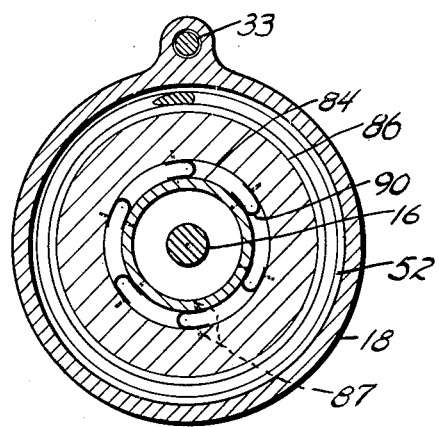
Figure 6:
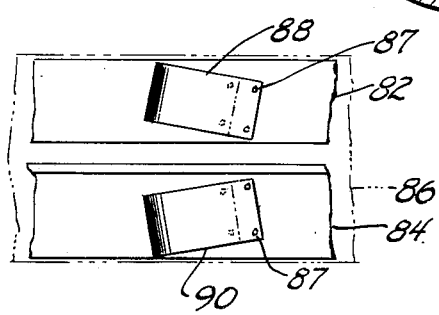

The specific nature and construction of a preferred embodiment of the invention is described in detail below in connection with the annexed drawing wherein similar reference characters indicate similar parts and wherein:

Fig. 1 is a longitudinal, partially sectional view of the governor;

Figs. 2, 3, 4 and 5 are respectively sections on the lines 2—2, 3—3, 4—4, and 5—5; and Fig. 6 is a phantom view of a part of the governor mechanism projected into a plane to show the operation of a part thereof.

The preferred arrangement of the invention as described herein is subject to all reasonable design modifications, the scope of the invention being defined in the claims.

In the drawings, 10 is a part of the governor housing which includes a mounting flange 11 adapted to be secured as by screws 12 to a corresponding mounting pad on a prime mover or other mechanisms to be controlled. The housing 10, through bearings 14, supports a main governor shaft 16 provided with a drive coupling 17 adapted to be engaged with a governor drive element of the prime mover. A second housing 18 is secured to the housing 10 by screws 20, the housing 18 containing the essential elements of the governor. The governing sub-assembly comprises ball races 22, 23, 24 and 25 which have balls contacting faces 27 between which a plurality of balls 29 are disposed, the balls being held in circumferentially spaced relation by a retainer 30. The faces 27 are so profiled, preferably, that the races 22 and 25 have no relative movement in an axial direction, nor do the races 23 and 24. However, the race pairs 22, 25 and 23, 24 are relatively axially movable to enable the balls 29 to move radially inwardly or radially outwardly while remaining in contact with all four ball race surfaces. The configuration of race faces 27 to attain ratio changes is more clearly shown in Chillson et al. application Serial No. 228,444, filed May 26, 1951. Preferably the faces of each race pair are in the form of concentric arcs. The ball races 24 and 25 rotate together; the race 23 is non-rotating, and the race 22, driven by the others through the balls, rotates or not depending on the relative positions of the several races.

The outer ball race 22 engages an output gear 31 concentric with the shaft 17, which drives an output pinion 32 whose shaft 33 is borne in bushings 34 and 35 in the housing 18. The shaft 33 comprises the governor output shaft which may be connected in any suitable manner to a speed controlling mechanism for the prime mover which drives the governor. The race 22 is further carried for rotation and for substantially fixed axial position by an anti-friction bearing 37 whose inner race is mounted on the shaft 16 and whose outer race engages an adapter 38 which supports the inner rim of a spring washer 40, the outer rim of the washer 40 being engaged with an annular recess on the hub of the gear 31. By this construction, the race 22 is free to rotate under control influences to be described, while being constrained against axial movement by the bearing 37.

The race 23 comprises a non-rotating reaction member for the governor assembly, the race, however, being axially movable under control influences. The race 23 is carried by the outer edge of a spring washer 42 whose inner edge is supported in an annular adapter 44. The adapter 44 is constrained against rotation relative to the housing 18 by spring strips 46 extending longitudinally of the governor and disposed between and secured to the adapter 44 and a sleeve 47, the latter sleeve being keyed to the housing 18 by a pin 48. The strips 46 provide a relatively friction-free means to allow relative axial movement but no relative rotation. The righthand end of the adapter 44 engages a spring seat 50 which in turn is engaged by the left end of a governor speeder spring 52. The right end of the speeder spring 52 engages a cup 54 which is adjustable axially of the governor by a control shaft 56 having a flange 58 engaging the cup. The cup is held from rotation by a pin 60 seated in the housing 18 and slidable in a hole in the cup. The flange 58 forms a simple thrust bearing and enables the control shaft 56 to be rotated relative to the cup. The control shaft 56 has screw thread engagement with the housing 18 so that rotation of the control shaft 56 moves the cup 54 rightwardly or leftwardly to unload or load the speeder spring 52. The terms left and right used herein refer only to the disposition of parts as shown in the drawings and infer no limitations in the arrangement of the parts.

The inner ball races 24 and 25 are coupled to rotate together with the drive shaft 16. Race 24 is arranged to move axially with respect to the drive shaft 16 and with the race 23, in response to speed errors and acceleration or deceleration of the shaft. It will be seen that the ball race 25 is seated on a flange 64 on the shaft 16 so that its rotation with the shaft is assured and so that it is anchored against axial movement with respect to the shaft. Thus, the ball races 22 and 25 are fixed in their axial position; the ball race 25 rotates with the shaft 16 while the ball race 22 may rotate as controlled by the action of the system. The ball race 24 is secured by an internal nut 66 to a plurality of fingers 68 extending rightwardly through notches 70 formed in the flange 64. The fingers 68 are integral with a sleeve 72 which forms a mounting for the inner race of an antifriction bearing 74, the outer race of the latter being engaged with the adapter 44 and the spring seat 50. The bearing 74 enables relative rotation between the sleeve 72 and the adapter 44 but holds them against relative axial movement whereby the ball races 23 and 24 may rotate relatively to one another but are constrained to joint axial movement under the influence of the speeder spring 52 and under the influence of the accelerometer to be described.

It will be noted that the races 22 and 25 while constrained against relative axial movement, are loaded against the balls 29 by the spring washer 40, to establish driving contact at opposite ends of the diameters of the balls. In the same manner, the races 23 and 24 while relatively rotatable, are loaded toward each other and into driving contact with the balls 29 by the spring washer 42. The sleeve 72 is secured for rotation with the shaft 16, and for free axial movement relative thereto through a bellows coupling 76 secured at its left end to the sleeve 72 and at its right end to a flange 78 secured to the shaft 16 by a nut 80.

Surrounding the coupling 76 is a cylinder 82 secured to the sleeve 72 and rotatable therewith. Formed integrally with the flange 78 is a cylinder 84 which is locked rotationally and axially relative to the shaft 16. Between the cylinders 82 and 84, and the inside of the speeder spring 52, is a flywheel or seismic mass 86 which constitutes an acceleration senser element. This mass is spaced from the cylinders and coupled by elastic strips 88 and 90 to the cylinders 82 and 84 respectively in a manner to be described, so that when the mass 86 rotates relatively to the cylinders 82 and 84, the cylinder 82 will be moved axially with respect to the cylinder 84. If rotation of the shaft 16 is uniform, the mass 86 will rotate uniformly therewith whereupon the axial position of the cylinders 82 and 84 will remain constant.

Particular reference may be made to Figs. 4, 5 and 6 which amplify the disclosure of the coupling between the cylinder 84, the mass 86 and the cylinder 82. Figs. 5 and 6 show the cylinder 84 around which are secured the plurality of thin flexible metal strips 90 each of which is formed in the shape of a U. The inner limb of each strip is secured to the cylinder 84 and the outer limb of each strip is secured to the surface of the mass 86 by pins 87. The strips 90 are sloped helically as shown in Fig. 6 so that if there is relative rotation between the cylinder and mass they are axially shifted relative to each other. Similar disposition to augment relative axial movement is made of the strips 88 between the cylinder 82 and the mass 86 the strips being secured by pins 87. When the strips are sufficiently flexible, thickness-wise, there is virtually frictionless support of the mass on the cylinders with little resistance to relative rotation. Yet when relative rotation exists between the cylinders and the mass the edgewise stiffness of the strips 88 and 90 enforce the desired axial movement. For a given angular displacement of the mass 86 relative to the cylinders, the cylinders will be moved toward or away from one another in an axial direction a certain distance, the mass 86 traveling axially half that distance if the strips 88 and 90 are symmetrically sloped as shown.

The assembly 82 to 90 constitutes an acceleration senser wherein the cylinder 82 is moved axially with respect to the cylinder 84 in accordance with acceleration or deceleration of the cylinder 84 relative to the mass 86. Thus, acceleration and deceleration of the shaft 16 imposes axial force on the races 23 and 24 in addition to the force exerted upon those races by the speeder spring 52 and by the axial component of centrifugal force exerted by the balls 29. The mass 86, the helical lead of the strips 88 and 90, and the allowable angular movement between the mass 86 and the sleeve 84, are so designed as cause shift from one limit of axial movement to the other of the races 23, 24 upon maximum expected acceleration or deceleration of the system.

Operation of the governor is outlined as follows. Let it be assumed that the prime mover is at rest and that the governor is set, through the adjusting shaft 56, to call for a certain speed. In this condition, the speeder spring 52 will have shifted, or will urge the races 23 and 24 leftwardly and the balls 29 will lie in a leftward and inward location toward the governor axis. When the machine is started, the shaft 16 rotates and accelerates, rotating the races 24 and 25. During acceleration, the mass 86 lags rotation of the shaft 16 and urges the races 23 and 24 rightwardly in a direction to diminish the effect of the speed error.

The races 24 and 25 drive the balls 29 against the non-rotating race 23, forcing the race 22 to rotate since the point of contact of the balls with the race 22 is offset in a radial direction from the point of contact of the balls with the non-rotating race 23. Rotation of the race 22 causes rotation of the control shaft 33 to a position calling for speed increase of the rotating system.

As the speed of the prime mover increases, the balls 29 are rotated not only about their own centers but in an orbit around the shaft 16 defined by the several races 22—25. With this orbital movement, the balls are whirling in a centrifugal field and tend to move radially outwardly. Their motion, due to the axially fixed race 22, tends to force the races 23 and 24 to the right to balance the force due to acceleration and the compression of the speeder spring 52. Final balance restores the acceleration senser mass 86 to a mid-angular position relative to the sleeves 82 and 84. During this rightward movement the control race 22 turns to a position representing the required speed correction. The race 22 stops turning when the points of contact of the balls 29 with the race 22 lie opposite the points of contact of the balls with the race 23. This becomes the equilibrium position and control effects from the shaft 33 on the prime mover terminate.

When the machine is operating on-speed, the rightward component of centrifugal force on the balls 29 balances the force of the speeder spring 52. Either through readjustment of the speed setting of the adjusting shaft 56 or through an exteriorly caused change in speed of the prime mover driving the governor, a speed error is created causing an unbalance between the force of the speeder spring and of the rightward component of centrifugal force from the balls 29. The acceleration or deceleration of the shaft 16 causes a lag or lead of the mass 86 with respect to the shaft causing an axial force on, and shift of the races 23 and 24, in addition to the axial shift of those races resulting from the aforesaid force unbalance due to speed error alone. These two factors modify the ratio of the transmission composed of the races 22—25 and the balls 29 and cause rotation of the race 22 in a direction which turns the shaft 33 to impose a speed correction upon the prime mover in a direction to restore the speed of the prime mover to the desired speed. Again, as the desired speed is attained through the anticipating effect yielded by the acceleration senser and the centrifugal force on the balls 29, the ratio of the transmission is restored to that at which the race 22 ceases rotation.

It will thus be seen that an acceleration or deceleration correction is superimposed on the required speed correction which will bring the machine back to the on-speed condition with minimum time lag, suppressing overshooting of the speed correction and rendering the governor extremely stable.

Since the races are loaded against the balls 29 by spring washers 40 and 42, the power with which the governor can drive the speed adjusting shaft 33 is not limited by the pressure exerted by the speeder spring 52. Consequently, the governor can produce a considerable amount of torque in the output shaft 33, which is capable of operating directly a suitable speed changing mechanism for the prime mover. There is no need to interpose a mechanism, which is usually required, to amplify the minute force produced by the conventional speed sensing device to a force which is capable of operating a speed changing mechanism.

The governor of this invention remains comparable to prior types of governor whose output power is small. When the needed auxiliary equipment is included with the prior type governor, my new governor provides an overall advantage in weight and bulk.

Though one embodiment of the invention is shown, it is to be understood that the invention may be applied in various forms and in various environments. Changes may be made in the arrangements shown without departing from the spirit of the invention. Reference should be had to the appended claims for definition of the limits of the invention.

What is claimed is:

1. A mechanical governor for speed control of a rotating body comprising a plurality of flyballs, a plurality of ball races engaging said balls, said races being arranged for relative movement as enforced by said balls due to centrifugal force imposed thereon by rotation thereof, means connecting one of said races to the rotating body for rotational drive thereby, means connecting another of said races for driven rotation by said balls to provide a governor output member, means fixing another of said races against rotation, means to secure one of said races against axial movement, adjustable elastic means urging said races and balls to certain relative positions against the action of centrifugal force on the balls, and said means which connects one race to the rotating body comprising an acceleration senser operative to urge the associated race axially in response to acceleration and deceleration of said rotating body.

2. A mechanical governor for speed control of a rotating body, comprising a plurality of flyballs, a plurality of ball races engaging said balls, said races being arranged for relative movement as enforced by said balls due to centrifugal force imposed thereon by rotation thereof, means connecting one of said races to the rotating body for rotational drive thereby, means connecting another of said races for driven rotation by said balls to provide a governor output member, means fixing another of said races against rotation, means to secure one of said races against axial movement, adjustable elastic means urging said races and balls to certain relative positions against the action of centrifugal force on the balls, said means which connects one race to the rotating body comprising an axially movable low-friction coupling, and means to operate said coupling for axial shift responsive to acceleration and deceleration of the rotating body.

3. A mechanical governor for speed control of a rotating body comprising a shaft driven by the body and having a ball race rotatable therewith and axially movable relative thereto, an acceleration senser mass rotatable with the shaft and rotatable relative thereto in response to shaft acceleration and deceleration, a low-friction coupling connected between and to said shaft, mass, and race, to move the race axially on the shaft in response to mass rotation relative to the shaft; a housing, a second race secured from rotation relative to the housing, a third race comprising a speed control output element, a fourth race secured for axial movement with one of the other races and secured for rotational movement with another one of the other races, balls between and engaging said races and rotatably driven by one of them, said balls comprising governor flyballs movable outwardly under the influence of centrifugal force, and elastic means connected to one of said races to urge the balls inwardly.

4. In a mechanical speed sensing and control mechanism for a rotating body, a shaft coupled to the body to rotate therewith, a sleeve rotatable with said shaft and movable axially therealong, means responsive to positive and negative acceleration of the shaft to move said sleeve axially in opposite directions, means responsive to speed change to move said sleeve axially, means controlled by and connected to said sleeve adapted to correct body speed in response to sleeve axial movements, said acceleration responsive means comprising a flywheel coaxial with and supported by the shaft, and angularly disposed means connecting said flywheel and shaft to convert relative rotation therebetween to relative axial movement between said shaft and sleeve.

5. In a mechanical speed sensing and control mechanism for a rotating body, a shaft coupled to the body to rotate therewith, a sleeve rotatable with said shaft and movable therealong, means responsive to acceleration of the shaft to move said sleeve axially, means responsive to speed changes in the shaft to move said sleeve axially, means controlled by and connected to said sleeve adapted to correct body speed in response to sleeve axial movements, said acceleration responsive means comprising a flywheel embracing said shaft and free to float rotationally relative thereto, a yieldable strip of U form having one limb thereof secured to said shaft and the other limb secured within and to said flywheel, and another yieldable strip of U form having one limb secured to the sleeve and the other limb secured within and to said flywheel.

6. In a mechanical speed sensing and control mechanism for a rotating body, a shaft coupled to the body to rotate therewith, a sleeve rotatable with said shaft and movable axially therealong, means responsive to acceleration of the shaft to move said sleeve axially, means responsive to speed changes in the shaft to move said sleeve axially, means controlled by and connected to said sleeve adapted to correct body speed in response to sleeve axial movements, said acceleration responsive means comprising a flywheel embracing said shaft and free to float rotationally relative thereto, a yieldable strip of U form having one limb thereof secured to said shaft and the other limb secured within and to said flywheel, and another yieldable strip of U form having one limb secured to the sleeve, and the other limb secured within and to said flywheel, one of said strips being helically disposed relative to said flywheel.

7. In a mechanical speed sensing and control mechanism for a rotating body, a shaft coupled to the body to rotate therewith, a sleeve rotatable with said shaft and movable axially therealong, means responsive to acceleration of the shaft to move said sleeve axially, means responsive to speed changes in the shaft to move said sleeve axially, means controlled by and connected to said sleeve adapted to correct body speed in response to sleeve axial movements, said acceleration responsive means comprising a flywheel embracing said shaft and free to float rotationally relative thereto, a yieldable strip of U form having one limb thereof secured to said shaft and the other limb secured within and to said flywheel, and another yieldable strip of U form having one limb secured to the sleeve and the other limb secured within and to said flywheel, said strips being helically disposed between the shaft and flywheel, and between the flywheel and sleeve, respectively.

8. In a mechanical speed sensing and control mechanism for a rotating body, a shaft coupled to the body to rotate therewith, an infinitely variable speed transmission driven by said shaft, said transmission having a rotatable output member variable in speed according to the ratio of said transmission for altering the speed of the rotating body, said transmission including means connected and responsive to the speed of said shaft connected to adjust the ratio of said transmission, and means further connected to said shaft responsive to shaft acceleration for further adjusting the ratio of said transmission.

9. In a mechanical speed sensing and control mechanism for a rotating body, a shaft coupled to the body to rotate therewith, an infinitely variable speed transmission driven by said shaft, said transmission having an output member for altering the speed of the rotating body, said transmission including means connected and responsive to the speed of said shaft connected to adjust the ratio of said transmission, and means further connected to said shaft responsive to shaft acceleration for further adjusting the ratio of said transmission, said latter means comprising a flywheel embracing said shaft, and yieldable U-shaped strips comprising spokes between said shaft, and flywheel, the limbs of the strips respectively being secured to the shaft and flywheel.

10. In a mechanical speed sensing and control mechanism for a rotating body, a shaft coupled to the body to rotate therewith, an infinitely variable speed transmission driven by said shaft, said transmission having an output member for altering the speed of the rotating body, said transmission including means connected and responsive to the speed of said shaft connected to adjust the ratio of said transmission, and means further connected to said shaft responsive to shaft acceleration for further adjusting the ratio of said transmission, said latter means comprising a flywheel embracing said shaft, and yieldable U-shaped strips comprising spokes between said shaft and flywheel, the limbs of the strips respectively being secured to the shaft and flywheel and said strips being helically disposed relative to the shaft and flywheel.

11. In a mechanical speed sensing and control mechanism for a rotating body, a shaft coupled to the body to rotate therewith, a speed changer driven by said shaft having an output member variable in speed according to the drive ratio of said speed changer, an acceleration senser responsive to body rotational acceleration, and means to change the drive ratio of said speed changer actuated by changes in speed of said shaft and by said acceleration senser.

12. A mechanical transmission sensitive to speed and acceleration comprising a plurality of relatively rotatable ball races together defining an annular cavity, a row of balls in said cavity engaged by the several faces of said races and rollable rotationally thereon, certain of said races being relatively axially movable thereby to decrease and increase the diameter of said annular cavity, means to drive one of said races rotationally thereby to enforce rotation of the balls in said cavity, the balls thereby being influenced by centrifugal force to move said races and enlarge the diameter of said cavity, elastic means engaging one of said races and urging decrease in the diameter of said cavity, means connected to one of said races axially movable to cause said race to enlarge or decrease the diameter of said annular cavity, and a mechanism sensitive to acceleration of said driving means connected to actuate said connected means in an axial direction, one of said races comprising an output member driven by said balls at various speeds different from the speed of said driving race, in accordance with the diameter of said annular cavity.

13. A mechanical governor sensitive to speed and acceleration comprising a variable speed transmission including a rotary driving member and elements rotated thereby and urged outwardly from the member axis by centrifugal force, elastically urged means engaging said elements and urging them inwardly against centrifugal force, a rotatable output member driven by and engaged with said elements and rotatable thereby at various speeds different from said driving member speed accordingly as said elements are disposed inwardly or outwardly relative to said member axis, an acceleration senser, and means energized by and connected to said acceleration senser and engaging said elements for urging them inwardly or outwardly under the control of said acceleration senser.

References Cited in the file of this patent

UNITED STATES PATENTS

| | | |
|---|---|---|
| 603,345 | Replogle | May 3, 1898 |
| 736,277 | Lombard | Aug. 11, 1903 |
| 1,370,080 | Ahond | Mar. 1, 1921 |
| 1,850,189 | Weiss | Mar. 22, 1932 |
| 2,113,624 | Madlé | Apr. 12, 1938 |
| 2,272,601 | Eksergian et al. | Feb. 10, 1942 |
| 2,306,696 | Hale | Dec. 29, 1942 |
| 2,336,654 | Tippen | Dec. 14, 1943 |
| 2,349,981 | Mulder | May 30, 1944 |
| 2,390,581 | Gille | Dec. 11, 1945 |
| 2,427,239 | Taylor | Sept. 9, 1947 |
| 2,472,181 | Werth | June 7, 1949 |
| 2,573,387 | Bush | Oct. 30, 1951 |